United States Patent [19]

Ault

[11] 3,889,069

[45] June 10, 1975

[54] LINE SUPERVISORY CIRCUIT

[75] Inventor: Cyrus Frank Ault, Wheaton, Ill.

[73] Assignee: Bell Telephone Laboratories, Incorporated, Murray Hill, N.J.

[22] Filed: Feb. 4, 1974

[21] Appl. No.: 439,346

[52] U.S. Cl. .......................... 179/18 F; 340/174 EB

[51] Int. Cl. .......................... H03k 17/82; G11c 11/14

[58] Field of Search. 340/174 EB, 174 CT, 174 QB; 179/18 F, 18 FA

[56] References Cited

UNITED STATES PATENTS

| | | | |
|---|---|---|---|
| 3,671,759 | 6/1972 | Dopheide | 179/18 F |
| 3,806,899 | 4/1974 | Myer | 340/174 EB |

*Primary Examiner*—Thomas A. Robinson
*Attorney, Agent, or Firm*—J. C. Albrecht

[57] ABSTRACT

A line supervisory circuit for determining the on-hook or off-hook status of a subscriber line subset responsive to current in the subscriber line. The line supervisory circuit includes a magnetic element having drive windings, interrogate windings, and sense windings. A magnetoresistor is connected in shunt across each drive winding. The magnetoresistors are magnetically cross coupled to the drive windings whereby undesirable current, which may be present in only one drive winding, is shunted so that a false off-hook indication does not result.

4 Claims, 1 Drawing Figure

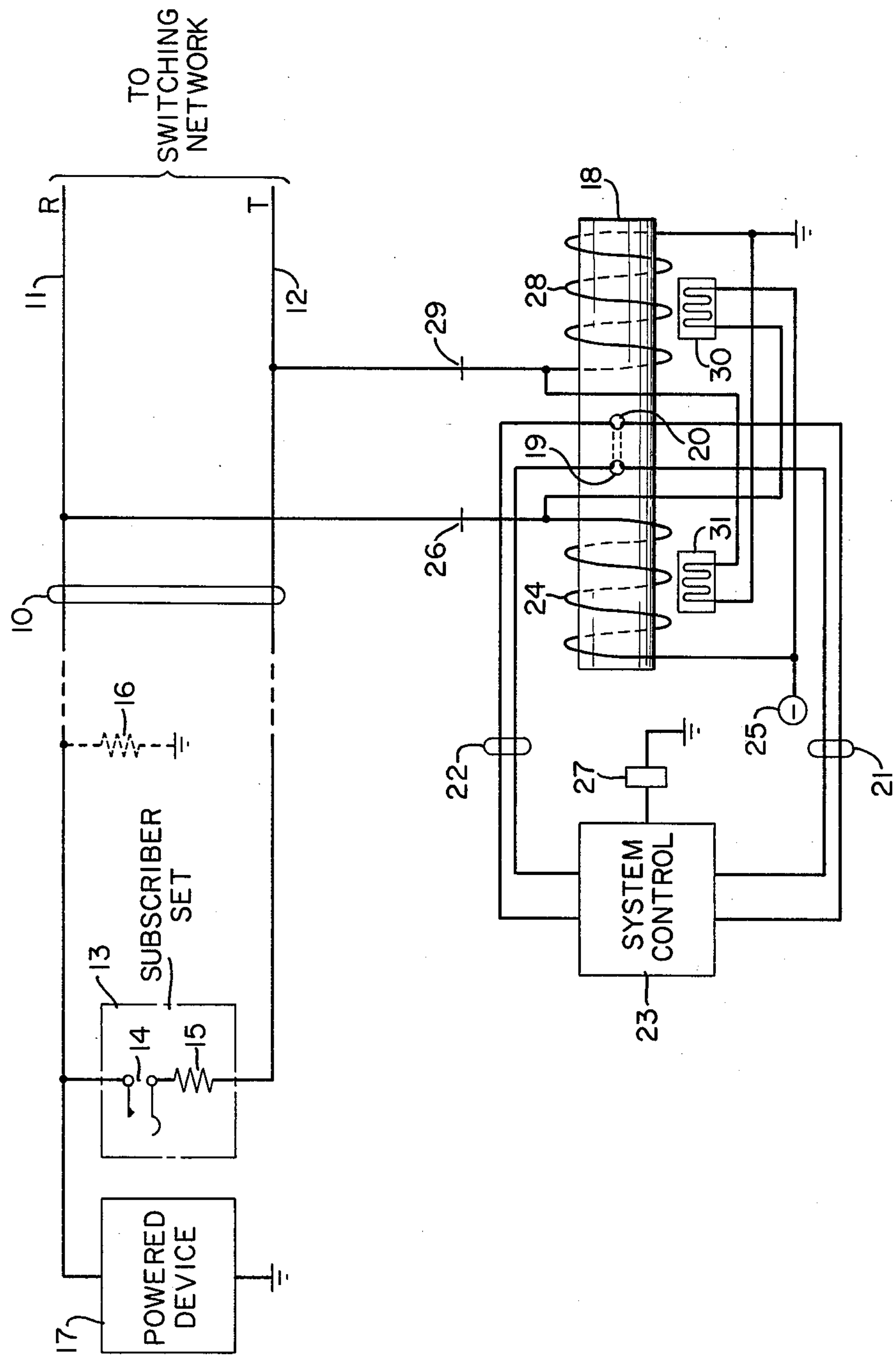
TO SWITCHING NETWORK
R
T
SUBSCRIBER SET
POWERED DEVICE
SYSTEM CONTROL

LINE SUPERVISORY CIRCUIT

BACKGROUND OF THE INVENTION

This invention relates to telephone switching systems and particularly to subscriber line supervisory circuits.

Line supervisory circuits are used in connection with a telephone central office to monitor the operative state of associated subscriber sets. One type of line supervisory circuit is used to detect the hookswitch conditions of a subscriber set. When the subscriber set goes off-hook, the resistance of the set is connected across the line by means of the hookswitch. This resistance completes a circuit in connection with the office battery which is applied to the line and results in current in the subscriber line. A line supervisory circuit makes use of this off-hook current to detect the off-hook condition. In one prior art arrangement described, for example, in *The Bell System Technical Journal* (BSTJ) Vol. 43, September 1964, at pages 2,257, et seq., a magnetic element termed a "ferrod" consists of a piece of magnetic material with two drive windings which are in series with the subscriber line so that a nonremanent magnetic flux is created in the magnetic material when off-hook current is present in the line. The ferrod also has an interrogate and a sense winding such that an interrogate signal will cause remanent magnetic flux switching in circular paths around two apertures, if there is no nonremanent flux present, to which switching the sense winding is responsive to generate an output signal.

The ferrod scanner is constructed to respond to current which flows through one drive winding, through the subscriber set and back through the other drive winding to the central office. There are certain cases, however, where current may be present in one drive winding but not in the other. One such case would be line leakage which in one case can be thought of as a characteristic lumped resistance from the line to ground, most often due to lines being wet. Another example would be the existence of a device requiring power at the subscriber premises such as a lamp associated with the subscriber set. If current due to such sources is of sufficient magnitude it may cause a false off-hook indication. This problem may occur, for example, during floods when the lines are extremely wet which could result in a complete loss of service to such lines. This problem also tends to discourage the use of auxiliary equipment associated with the subscriber set which equipment might require power and, in many cases, would presently impose the burden of providing an independent power source.

SUMMARY OF THE INVENTION

A line supervisory circuit comprises a ferrod element having one drive winding in series between the ring conductor and the central office battery and other drive winding in series between the tip conductor of the subscriber line to be supervised and ground. The ring and tip drive windings are coupled to opposite ends of the element which has a nonremanent flux generated in a longitudinal path by current in those windings and also a remanent flux in a partial closed path around each of two apertures in the element. An interrogate winding and a readout winding are coupled to the closed paths such that a signal on the interrogate winding switches the remanent flux to generate a signal on the readout winding. Both the ring and tip drive windings have respective magneto-resistors, whose resistance varies directly with the magnetic field they are placed in, electrically connected in paprallel across them but inductively coupled to opposite windings. When no current is present in either ring or tip drive winding and a signal is applied to the interrogate winding, remanent flux will switch thereby generating a signal on the readout winding which is interpreted as the on-hook state. With current in only one winding, (which is characteristic of spurious currents), the magnetoresistor across the affected winding will be at a low resistance value as a result and will shunt that current with the result that only a very small flux field is applied to the ferrod due to that current. If, at this time, a signal is applied to the interrogate winding, the remanent flux will still switch resulting in an indication on the readout winding which is interpreted as the on-hook state. If current is present in both the ring and tip windings, then both magnetoresistors are at a high resistance value and a large nonremanent flux is present in the entire magnetic element. If the interrogate winding is non energized, the nonremanent flux will prevent the remanent flux from switching, resulting in no signal on the readout winding which is interpreted as the off-hook state. This circuit thus advantageously has the desired effect of treating current in either winding alone as if there were no current present at all thereby preventing false off-hook indications.

BRIEF DESCRIPTION OF THE DRAWING

The organization and operation of a line supervisory circuit according to this invention will be better understood from a consideration of the detailed description of the organization and operation of one illustrative embodiment thereof which follows when taken in conjunction with the accompanying drawing, the single FIGURE of which depicts an exemplary line supervisory circuit connected between a subscriber line and the central office battery of a typical telephone central office.

DETAILED DESCRIPTION

One illustrative line supervisory circuit according to this invention is shown in the drawing as being connected across the ring and tip connectors 11 and 12 of a typical telephone subscriber line 10 at the central office. Only a representative portion of a subscriber line is shown and it will be appreciated that the line is extended to the switching network of the telephone system. The subscriber end of the line 10 is connected to a standard subscriber set 13, represented in the drawing only to the extent of showing its normally open hookswitch contacts 14 in series with a resistance 15 which resistance represents the characteristic resistance of the subscriber set when it is in its off-hook state. A line leakage resistance 16 is shown in a dashed-line connection between the ring lead 11 and ground as being representative of the lumped resistance between that lead and ground. Typically, the line leakage resistance 16 is very high; however, in cases where the subscriber line becomes wet as during a flood or heavy rain, the resistance can become low enough to drawn an appreciable amount of current. A powered device 17 is also shown connected to the ring lead 11 at the subscriber premises and represents any device associated with the subscriber set which it is desired to power from the central office. One such powered device would be, for example, a lamp for lighting the dial of the subscriber set.

The line supervisory circuit comprises a magnetic ferrod element 18 exhibiting an essentially square hysteresis loop. The element 18 is provided with a pair of apertures 19 and 20 about each of which a remanent flux may be switched responsive to drive currents in windings coupled therethrough. These windings comprise an interrogate winding 21 and a readout winding 22. The latter windings are extended to the telephone system control 23 shown only in block symbol form. Since control 23 does not comprise an element of this invention it need not be considered beyond the control functions performed and the signals received thereby insofar as these functions relate to the present invention.

The magnetic element 18 has a drive winding 24 wound around one of its ends and electrically connected between the ring lead 11 and the central office battery 25 via a break contact 26 of a cut-off relay 27. Another drive winding 28 is wound around the other end of the magnetic element 18 and is connected between the tip lead 12 and ground via a break contact 29 of cut-off relay 27. A first magnetoresistor 30 is connected electrically in parallel with the drive winding 24 but is inductively coupled to the drive winding 28. A second magnetoresistor 31 is connected electrically in parallel with the drive winding 28 and is inductively coupled to the drive winding 24. Each of magnetoresistors 30 and 31 has a resistance value which is a direct function of the magnetic field in which it is placed. Thus, when a magnetoresistor is not in the presence of a magnetic field it is at a certain low resistance value and when it is in a magnetic field of a predetermined strength it is at a certain high resistance value.

The cut-off relay 27 is assumed to be not operated, i.e., both its contacts 26 and 29 are closed. Once an off-hook state of the subscriber set has been detected, the relay 27 will be operated by the system control 23, opening contacts 26 and 29. However, since the present invention is concerned with the detection of the off-hook state, only the not operated condition of the relay 27 need be considered. The relay 27 and its contacts are only shown to provide an operational context for the present invention.

With the circuit of this invention connected as described, an illustrative operation may now be considered.

If the subscriber set 13 is in an on-hook condition and contacts 14 are open and no current is being drawn by either the leakage resistance 16 or the powered device 17, then no current will be present in either drive winding 24 or 28 and no magnetic field will be created by them. Since neither magnetoresistor 30 nor 31 is thus in a magnetic field, they will both be at a low resistance value; however, since no current is flowing in either drive winding 24 or 28, their state is unimportant in this condition of the line supervisory circuit. With the circuit in this state, if the system control 23 transmits an interrogate pulse to the interrogate winding 21, the remanent flux around each aperture 19 and 20 will be switched from its normal state to the opposite state resulting in a signal being generated on the readout winding 22 which signal is detected by the system control 23. Conventionally, the system control 23, after it has generated an interrogate signal and sensed the response, will generate a second signal of opposite polarity to return the remanent flux to the normal states.

If the subscriber set 13 is in an off-hook state, that is, having contacts 14 closed, then the characteristic resistance 15 of the subscriber set will be connected across the subscriber line 10 and will complete a circuit resulting in current in the line from the office battery 25. This current will pass through both the ring drive winding 24 and the tip drive winding 28 resulting in a nonremanent flux being generated in a longitudinal, partially complete flux path through the magnetic element 18 by the combined effect of the fields generated by the two drive windings 24 and 28. The magnetoresistors 30 and 31 will, as a result, both be in a magnetic field and therefore at a high resistance value whereby they will shunt only a small portion of the current passing through the drive windings. With the line supervisory circuit in this state, if the system control 23 generates an interrogate signal on the interrogate winding 21, the remanent flux surrounding apertures 19 and 20 will not switch because the nonremanent flux which is present has the effect of overriding and preventing this reversal. As a result, no signal will be generated on the readout winding 22 and the system control 23 will sense this absence of signal and interpret it as an off-hook condition at the subscriber set 13.

When the subscriber set 13 is on-hook and at the same time an appreciable amount of current is drawn either by the line leakage resistance 16 or a powered device 17, for example, then there will be current in the drive winding 24. Since there is no current in the other winding 28, the magnetoresistor 30 will not be in a magnetic field and will be at a low resistance value and will thus shunt a large portion of the current in the ring drive winding 24. As a result, the magnetic field generated by the ring drive winding 24 is greatly reduced. With the line supervisory circuit in this state, insufficient nonremanent flux is present to prevent the switching of the remanent flux as described above in the off-hook condition. As a result, the system control 23 will correctly interpret this state of the subscriber equipment as being the on-hook condition despite the spurious current in ring conductor 11.

It will be appreciated from a consideration of the symmetry of the magnetoresistor and drive winding arrangement that if spurious current, e.g., leakage from the tip lead to a parallel lead with a voltage on it, is present in the tip lead the operation of the circuit will be the same as the above described operation with the function of the ring and tip drive windings and respective magnetoresistors interchanged and will yield the same result.

What has been described is considered to be only a specific illustrative embodiment of the invention and it is to be understood that various other arrangements may be devised by one skilled in the art without departing from the spirit and scope thereof as defined by the accompanying claims.

What is claimed is:

1. An electrical circuit for monitoring current in a monitored circuit comprising a magnetic element of a material exhibiting substantially rectangular hysteresis characteristics and presenting a closed and a partial flux path, an interrogate winding coupled to said closed flux path for selectively establishing remanent flux in said closed flux path to a first state and to a second state, means for generating an inhibiting flux in said magnetic element for preventing said remanent flux from switching from said first state to said second state comprising a first and a second drive winding coupled to said partial flux path, said monitored circuit completing a conducting path between said first and second drive windings when in one operative state, said drive windings being individually coupled in a sense and in a number of turns so that a current of a predetermined value in said monitored circuit is sufficient to induce said inhibiting flux in said partial flux path, means for sensing said switching of said remanent flux comprising a readout winding coupled to said closed flux path, and means for inhibiting the induction of an inhibiting flux in said partial flux path due to current in only one of said drive windings comprising first and second magnetoresistor means electrically connected respectively in parallel with said first and second drive windings and inductively coupled respectively to said second and first drive windings, each of said magnetoresistor means having first and second resistance values in the presence of first and second predetermined magnetic fields, respectively.

2. An electrical circuit for monitoring current in a monitored circuit comprising a magnetic element of a material exhibiting substantially rectangular hysteresis characteristics and presenting a closed and a partial flux path, an interrogate winding coupled to said closed flux path for selectively establishing remanent flux in said closed flux path to a first state and to a second state, means for generating an inhibiting flux in said magnetic element for preventing said remanent flux from switching from said first state to said second state comprising a first and a second drive winding coupled to said partial flux path, said monitored circuit completing a conducting path between said first and second drive windings when in one operative state, said drive windings being individually coupled in a sense and in a number of turns so that a current of a predetermined value in said monitored circuit is sufficient to induce said inhibiting flux in said partial flux path, and means for inhibiting the induction of an inhibiting flux in said partial flux path due to current in only said first drive winding comprising magnetoresistor means electrically connected in parallel with said first drive winding and magnetically coupled to said second drive winding, said magnetoresistor means having first and second resistance values in the presence of first and second predetermined magnetic fields, respectively.

3. In combination, a ferrod scanner for monitoring the state of the hookswitch of a telephone subscriber set, means for inhibiting the induction of an inhibiting flux due to current in only a first drive winding of said scanner comprising a magnetoresistor means electrically connected in parallel with said first drive winding and magnetically coupled to a second drive winding of said scanner, said magnetoresistor means having a first and a second resistance value in the presence of a first and second predetermined magnetic field, respectively.

4. An electrical switching circuit comprising a ferrod element presenting a longitudinal partial flux path and a closed flux path about at least one aperture in said element, set winding means threading said aperture energizable for establishing a remanent flux in said closed flux path, said set winding means also being energizable for switching said remanent flux in said closed flux path, readout winding means also threading said aperture energizable responsive to flux switching in said closed flux path for generating an output signal, a first and a second drive winding means inductively coupled to respective ends of said element simultaneously energizable for establishing a flux in said partial flux path for preventing flux switching in said closed flux path, and means for preventing said flux in said partial flux path responsive to the energizing of only one of said first and second drive winding means comprising a first and a second magnetoresistor inductively coupled to said first and second drive winding means, respectively, and electrically connected in parallel with said second and first drive winding means, respectively, said first and second magnetoresistors each presenting a low resistance and thereby a current shunt path in the absence of a magnetic field and high resistance in the presence of a magnetic field of a predetermined magnitude.

* * * * *